US010731705B2

(12) United States Patent
Chang

(10) Patent No.: US 10,731,705 B2
(45) Date of Patent: Aug. 4, 2020

(54) DETECTING APPARATUS FOR DETECTING AXIAL DISPLACEMENT OF BEARING UNIT

(71) Applicant: Buffalo Machinery Company Limited, Taichung (TW)

(72) Inventor: Paul Chang, Taichung (TW)

(73) Assignee: BUFFALO MACHINERY COMPANY LIMITED, Taichung (TW)

( * ) Notice: Subject to any disclaimer, the term of this patent is extended or adjusted under 35 U.S.C. 154(b) by 234 days.

(21) Appl. No.: 15/944,836

(22) Filed: Apr. 4, 2018

(65) Prior Publication Data

US 2019/0010987 A1     Jan. 10, 2019

(30) Foreign Application Priority Data

Jul. 4, 2017     (TW) .............................. 106209777 U

(51) Int. Cl.
*F16C 33/58*     (2006.01)
*F16C 41/00*     (2006.01)
*F16C 19/52*     (2006.01)
*G01L 5/00*     (2006.01)
*F16C 25/06*     (2006.01)
*F16C 19/36*     (2006.01)
(Continued)

(52) U.S. Cl.
CPC ............ *F16C 33/583* (2013.01); *F16C 19/36* (2013.01); *F16C 19/522* (2013.01); *F16C 41/00* (2013.01); *G01L 5/0009* (2013.01); *G01L 5/0019* (2013.01); *F16C 19/08* (2013.01); *F16C 25/06* (2013.01); *F16C 35/12* (2013.01); *F16C 2233/00* (2013.01); *F16C 2322/39* (2013.01)

(58) Field of Classification Search
None
See application file for complete search history.

(56) References Cited

U.S. PATENT DOCUMENTS 4,924,713 A * 5/1990 Machino ............ B23Q 17/0966
73/104
2007/0014500 A1    1/2007 Iwamoto et al.
(Continued)

FOREIGN PATENT DOCUMENTS

EP     2446998 A1     5/2012

OTHER PUBLICATIONS

Search Report issued to European counterpart application No. 17200282.6 by the EPO dated Dec. 12, 2018.
(Continued)

*Primary Examiner* — Eric S. McCall
*Assistant Examiner* — Timothy P Graves
(74) *Attorney, Agent, or Firm* — Birch, Stewart, Kolasch & Birch, LLP

(57) ABSTRACT

A detecting apparatus for detecting displacement of a bearing unit sandwiched between a spindle extending in an axial direction and a spindle seat is provided. The detecting apparatus includes a detector unit and a control unit. The detector unit includes a pair of sensing devices with each sensing device including a sensor that abuts against an end surface of an outer ring of the bearing unit and outputting, based on a sensing of the sensor thereof, a detected signal associated with a displacement of the end surface in the axial direction. The control unit is configured to determine whether the bearing unit is abnormal based on the detected signals.

9 Claims, 5 Drawing Sheets

(51) Int. Cl.
 *F16C 35/12* (2006.01)
 *F16C 19/08* (2006.01)

(56) References Cited

U.S. PATENT DOCUMENTS

| | | |
|---|---|---|
| 2007/0051187 A1 | 3/2007 | McDearmon |
| 2007/0063620 A1* | 3/2007 | Kluft ............... B23Q 1/265 310/338 |
| 2012/0109539 A1* | 5/2012 | Hasegawa ........... B23Q 17/008 702/34 |
| 2016/0123839 A1* | 5/2016 | Gallimore ............ F01D 21/003 384/448 |

OTHER PUBLICATIONS

Office Action issued to Russian counterpart application No. 2018123582 by the Russian Office for Patents, Trademarks and Designs dated Jan. 25, 2019.

* cited by examiner

DETECTING APPARATUS FOR DETECTING AXIAL DISPLACEMENT OF BEARING UNIT

CROSS-REFERENCE TO RELATED APPLICATION

This application claims priority of Taiwanese Patent Application No. 106209777, filed on Jul. 4, 2017.

FIELD

The disclosure relates to a detecting apparatus, more particularly to a detecting apparatus for detecting axial displacement of a bearing unit.

BACKGROUND

To facilitate spinning of a spindle in a spindle seat, a plurality of bearings are sandwiched between a spindle and a spindle seat with each bearing including inner and outer rings respectively abutting against an outer surface of the spindle and an inner surface of the spindle seat. The spindle is usually mounted with a machining device such as a cutlery at a terminating end of the spindle. However, the inner and outer rings of each bearing may displace relative to each other after a period of use due to rotation of the spindle and the weight of the machining device. As a result, the spindle may deviate from an axis about which the spindle is supposed to rotate and be damaged eventually.

SUMMARY

Therefore, an object of the present disclosure is to provide a detecting apparatus for detecting an axial displacement of a bearing unit.

According to one aspect of the present disclosure, a detecting apparatus for detecting an axial displacement of a bearing unit. The bearing unit is sandwiched between a spindle extending in an axial direction and a spindle seat. The bearing includes at least one bearing including an outer ring, an inner ring and a plurality of roller members. The outer ring abuts against an inner surface of the spindle seat and has two end surfaces opposite to each other in the axial direction. The inner ring is surrounded by the outer ring and surrounds and abuts against an outer surface of the spindle. The roller members are disposed between the outer ring and the inner ring. The detecting apparatus includes a detector unit and a control unit. The detector unit includes at least one pair of sensing devices each of which includes a sensor abutting against one of the end surfaces of the outer ring. Each of the sensing devices outputs, based on sensing performed by the sensor thereof, a detected signal associated with an axial displacement of the one of the end surfaces of the outer ring in the axial direction. The control unit is communicatively connected to the detector unit for receiving the detected signals respectively from the sensing devices and is configured to determine whether the bearing unit is abnormal based on the detected signals.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
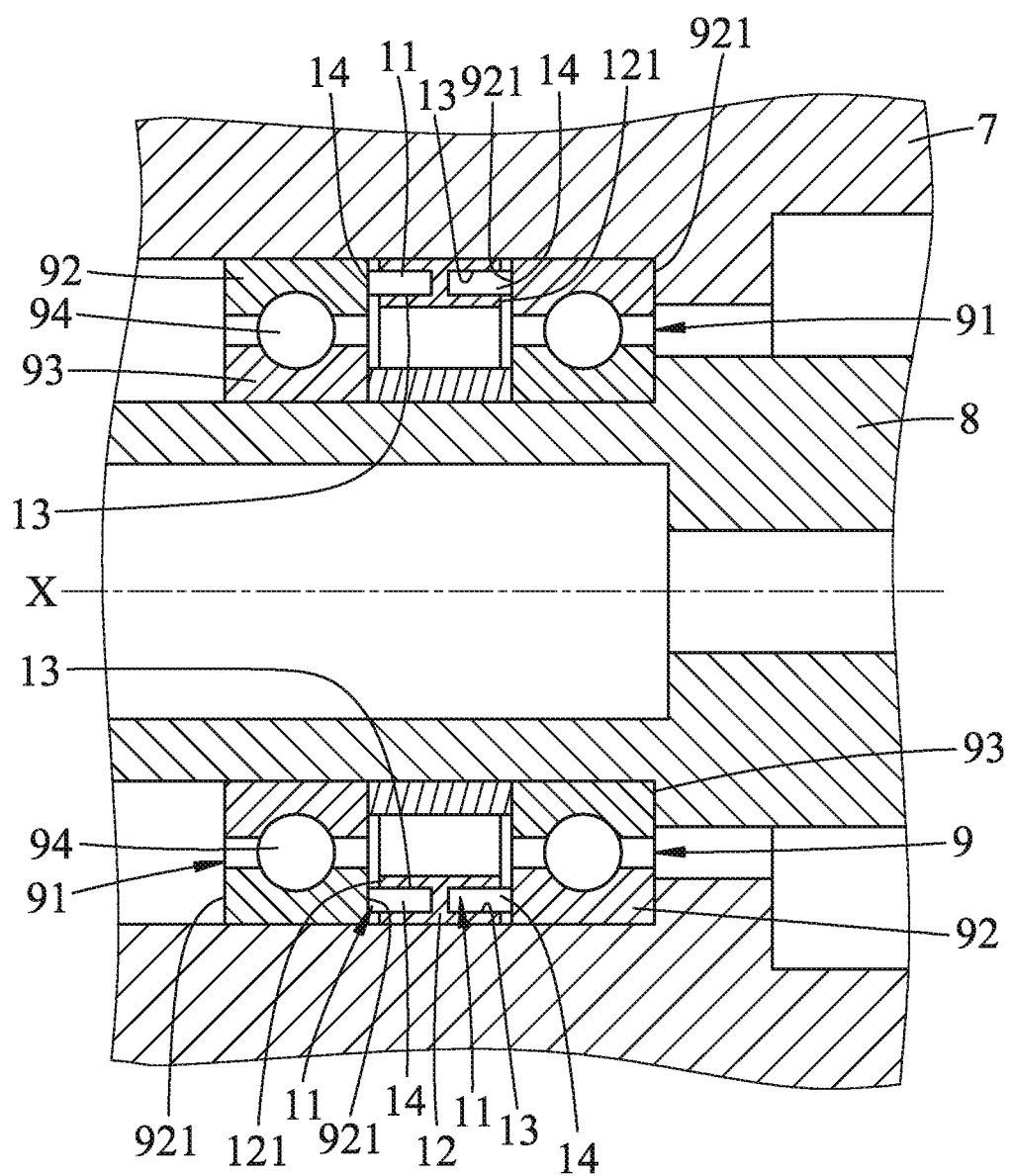
FIG. 1 is a schematic fragmentary sectional view of a bearing unit subjected to detection by a detecting apparatus according to an embodiment of the present disclosure.
Figure 2:
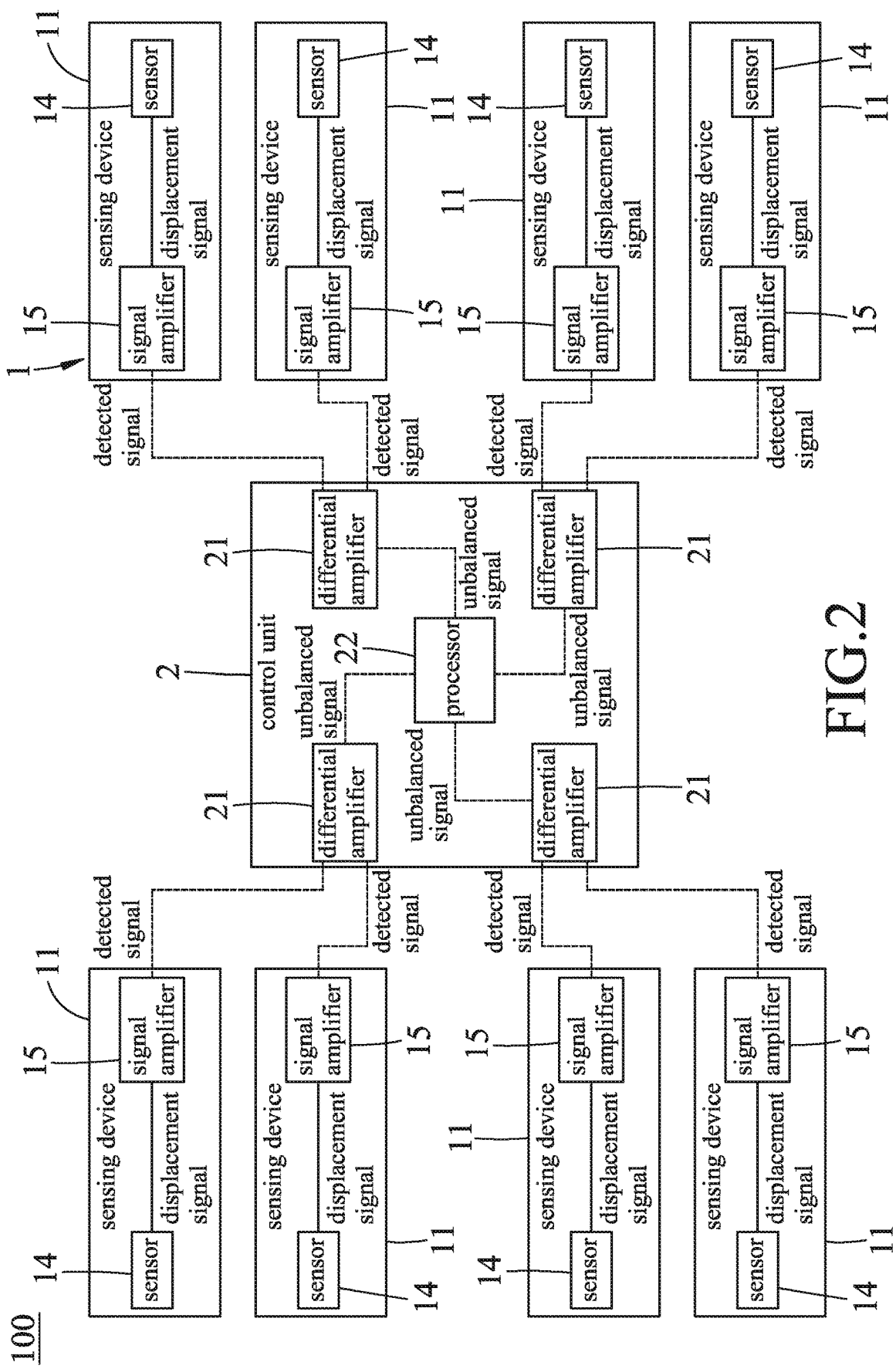
FIG. 2 illustrates a schematic block diagram of the detecting apparatus of the embodiment of FIG. 1.
Figure 3:
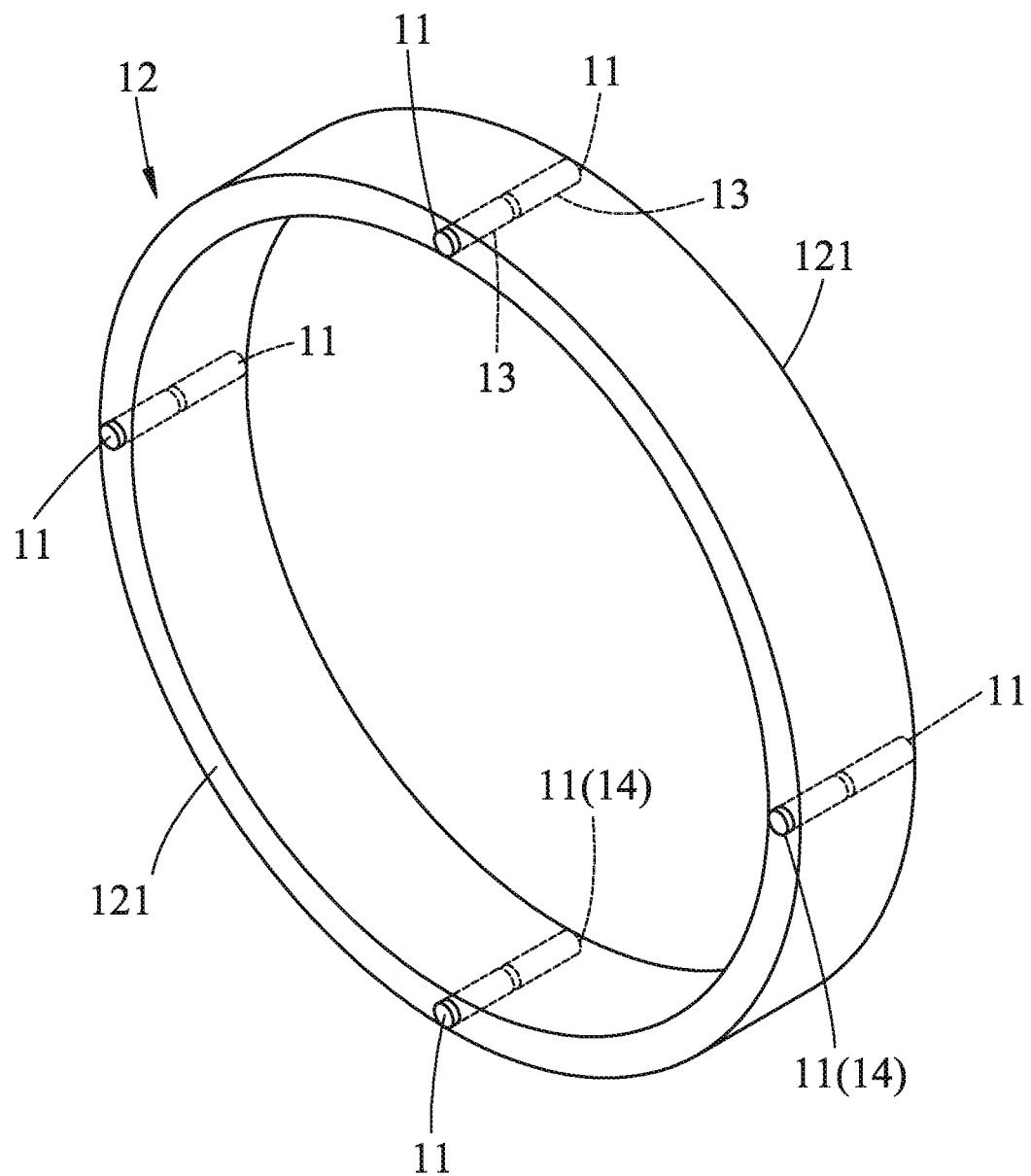
FIG. 3 is a schematic perspective view of an annular mount of the detecting apparatus of FIG. 1.

Referring to FIGS. 1 to 3, a detecting apparatus 100 according to an embodiment of this disclosure is for detecting an axial displacement of a bearing unit 9. The bearing unit 9 is sandwiched between a spindle 8 extending in an axial direction (X) and a spindle seat 7, and includes two bearings 91 spaced apart from each other in the axial direction (X). Each of the bearings 91 includes an outer ring 92 that abuts against an inner surface of the spindle seat 7 and that has two end surfaces 921 opposite in the axial direction (X), an inner ring 93 that is surrounded by the outer ring 92 and that surrounds and abuts against an outer surface of the spindle 8, and a plurality of roller members 94 disposed between the outer ring 92 and the inner ring 93. Note that the number of the bearings 91 may vary, e.g., more than two bearings 91 may be used in an embodiment.

The detecting apparatus 100 includes a detector unit 1 and a control unit 2. The detector unit 1 includes an annular mount 12 (see FIG. 3) and eight sensing devices 11 each including a sensor 14 and a signal amplifier 15.

The annular mount 12 is mounted between the spindle 8 and the spindle seat 7, is sandwiched between the two bearings 91, and has two end mount surfaces 121 opposite to each other in the axial direction (X). Each of the end mount surfaces 121 faces one of the end surfaces 921 of a respective one of the bearings 91.

Every two of the sensing devices 11 that are diametrically opposite to each other with respect to the spindle 8 and that are proximate to the same end surface 921 of the outer ring 92 of the same bearing 9 constitute a pair. The sensors 14 of each pair of the sensing devices 11 are mounted diametrically opposite to each other with respect to the spindle 8 and abut against one of the end surfaces 921 of the outer ring 92 of the corresponding one of the bearings 91, and each sensor 14 is configured to perform sensing related to the bearing 91 (e.g., to directly or indirectly sense an axial displacement of said one of the end surfaces 921 in the axial direction (X)), and to output a displacement signal associated with the axial displacement based on the sensing thereof.

Specifically, FIG. 1 illustrates four sensors 14 of two pairs of the sensing devices 11, in which the left two sensors 14 of one pair of the sensing devices 11 abut against one of the end surfaces 921 of the outer ring 92 of the left one of the bearings 91 and the right two sensors 14 of the other pair of the sensing devices 11 abut against one of the end surfaces 921 of the outer ring 92 of the right one of the bearings 91 that faces said one of the end surfaces 921 of the left one of the bearings 91. Note that for each of the bearings 91, two pairs of the sensors 14 that are proximate thereto are used for detecting an axial displacement of the bearing 91 in this embodiment, and the number of the sensing devices 11 may vary in other embodiments of this disclosure.

Each of the end mount surfaces 121 of the annular mount 12 is formed with two pairs of grooves 13 in which the sensors 14 of two pairs of the sensing devices 11 that are proximate to and used for detecting the axial displacement of the respective one of the bearings 91 are inserted.

The signal amplifier 15 of each sensing device 11 is electrically connected to the sensor 14 of the sensing device 11 and is configured to generate a detected signal based on the displacement signal received from the sensor 14 by, for example, performing amplification on the displacement signal. The sensors 14 of the sensing devices 11 are piezoelectric sensors and the signal amplifiers 15 of the sensing devices 11 are charge amplifiers in this embodiment. Each piezoelectric sensor may sense changes in force exerted thereon resulting from an axial displacement of the corresponding bearing 91, and convert the changes in force to electric charges, i.e., the displacement signal. In other embodiments of this disclosure, the sensors 14 may be displacement sensors and the signal amplifiers 15 may be voltage amplifiers, and the present disclosure is not limited in this respect.

The control unit 2 is communicatively connected to the detector unit 1 for receiving the detected signals respectively from the sensing devices 11, and is configured to determine whether each bearing unit 9 is abnormal (e.g., that the bearing unit 9 has been displaced from its intended position relative to the spindle 8 and/or the spindle seat 7) based on the detected signals.

Specifically, the control unit 2 includes four differential amplifiers 21 and a processor 22. Note that one differential amplifier 21 corresponds to one pair of the sensing devices 11, i.e., the number of the differential amplifiers 21 corresponds to number of pairs of the sensing devices 11. Each of the differential amplifiers 21 is electrically connected to the signal amplifiers 15 of a respective pair of the sensing devices 11 for receiving the detected signals therefrom, and is configured to output an unbalanced signal associated with a difference between the detected signals received from the signal amplifiers 15 of the respective pair of the sensing devices 11.

The processor 22 is communicatively connected to the differential amplifiers 21 for receiving the unbalanced signals respectively therefrom, and is configured to determine, for each of the unbalanced signals, whether an amplitude thereof exceeds a predetermined threshold, and to, when the determination made above is affirmative, output an alert signal to indicate that one of the bearings 91 sensed by the pair of sensing devices 11 to which the differential amplifier 21 generating the unbalanced signal is electrically connected is abnormal. It can be appreciated that the predetermined threshold can be varied according to user demand.

In this embodiment, since each of the opposite end mount surfaces 121 of the annular mount 12 is formed with the grooves 13 for insertion of the corresponding sensors 14, detections of axial displacements of the two adjacent bearings 91 can be achieved with only one annular mount 12.

Figure 4:
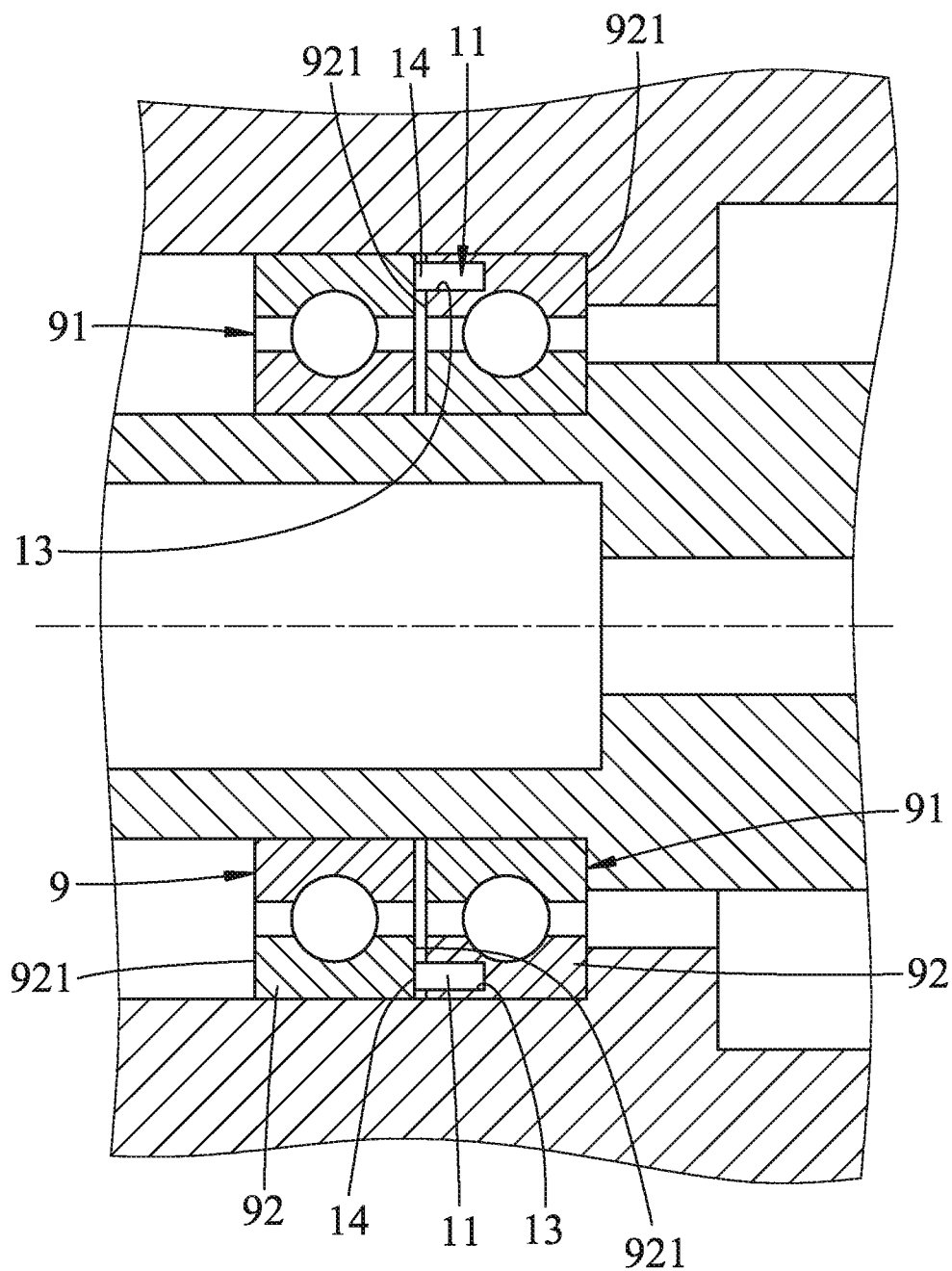
FIG. 4 is a schematic fragmentary sectional view of a modified bearing unit subjected to detection by a detecting apparatus according to another embodiment of this disclosure.
Figure 5:
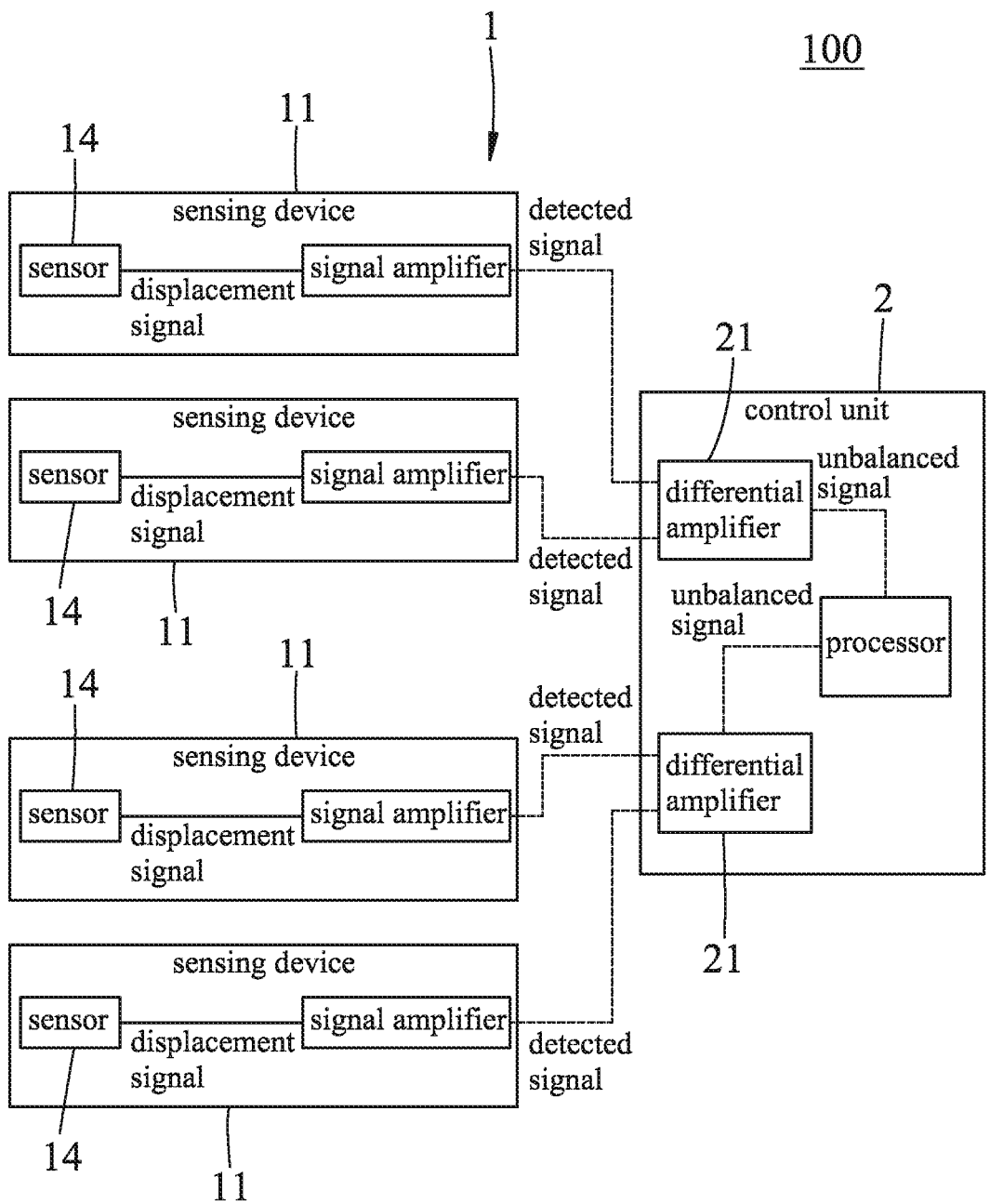
FIG. 5 is a schematic block diagram of the detecting apparatus of FIG. 4.

Referring to FIGS. 4 and 5, another embodiment of the detecting apparatus 100 for detecting an axial displacement of a modified bearing unit 9 is illustrated. The difference between the embodiment shown in FIGS. 1 to 3 and this embodiment resides in that, in this embodiment, the annular mount 12 (see FIG. 3) is omitted, the detector unit 1 includes only two pairs of sensing devices 11 of which the sensors 14 correspond in position to the two bearings 91 of the bearing unit 9, and the control unit 2 includes only two differential amplifiers 21 respectively and electrically connected to the two pairs of the sensing devices 11. In FIG. 4, (the left) one of the end surfaces 921 of the outer ring 92 of (the right) one of the bearings 91 is formed with two pairs of grooves 13 (only one pair is shown in FIG. 4). The sensors 14 are mounted, by way of insertion into the grooves 13, to (the left) one of the end surfaces 921 of the outer ring 92 of (the right) one of the bearings 91 that faces (the right) one of the end surfaces 921 of the outer ring 92 of the other (the left) one of the bearings 91 against which the sensors 14 abut.

To sum up, in the present disclosure, by virtue of the sensing devices 11 that detect axial displacements of the end surfaces 921 of the outer rings 92 of the bearings 91 in the axial direction (X), a staff can be notified by the alert signal when the amplitude of the unbalanced signal from any one of the differential amplifiers 21 exceeds the predetermined threshold. By this way, the staff can timely repair or calibrate the bearings 91 to thereby prevent damage to the spindle 8.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A detecting apparatus for detecting axial displacement of a bearing unit that is sandwiched between a spindle extending in an axial direction and a spindle seat and that includes at least one bearing including an outer ring, and inner ring and a plurality of roller members, the outer ring abutting against an inner surface of the spindle seat and having two end surfaces opposite to each other in the axial direction, the inner ring being surrounded by the outer ring and surrounding and abutting against an outer surface of the spindle, the roller members being disposed between the outer ring and the inner ring, said detecting apparatus comprising:

a detector unit including at least one pair of sensing devices, each of said sensing devices of said at least one pair including a sensor that abuts against one of the end surfaces of the outer ring of the bearing, and outputting, based on sensing performed by said sensor thereof, a detected signal associated with an axial displacement of said one of the end surfaces of the outer ring in the axial direction, wherein said sensors of said sensing devices of said at least one pair are mounted diametrically opposite to each other with respect to the spindle, and abut against one of the end surfaces of the outer ring of the bearing for performing the sensing which is associated with the axial displacement of said one of the end surfaces of the outer ring; and a control unit communicatively connected to said detector unit for receiving the detected signals respectively from said sensing devices, configured to determine whether the bearing unit is abnormal based on the detected signals, and including a differential amplifier communicatively connected to said sensing devices of said at least one pair and configured to output an unbalanced signal associated with a difference between the detected signals received from said sensing devices of said at least one pair, and a processor communicatively connected to said differential amplifier and configured to determine whether an amplitude of the unbalanced signal exceeds a predetermined threshold and to output an alert signal to indicate that the bearing unit is abnormal when the determination thus made is affirmative.

2. The detecting apparatus as claimed in claim 1, wherein said sensor of each of said sensing devices of said at least one pair is configured to output a displacement signal based on the sensing thereof, and each of said sensing devices further includes a signal amplifier electrically connected to said differential amplifier and said sensor of said sensing device and configured to generate the detected signal for receipt by said differential amplifier based on the displacement signal received from said sensor.

3. The detecting apparatus as claimed in claim 2, wherein said sensors of said sensing devices are piezoelectric sensors and said signal amplifiers of said sensing devices are charge amplifiers.

4. The detecting apparatus as claimed in claim 1, the bearing unit including two of the bearings spaced apart from each other in the axial direction, wherein said sensors of said sensing devices of said at least one pair abut against one of the end surfaces of the outer ring of one of the bearings, and are to be mounted to one of the end surfaces of the outer ring of the other of the bearings that faces said one of the end surfaces of the outer ring of the one of the bearings.

5. The detecting apparatus as claimed in claim 1, further comprising said detector unit includes an annular mount mounted between the spindle and the spindle seat disposed adjacent to said one of the end surfaces of the outer ring of the bearing, and having an end mount surface that faces said one of the end surfaces of the outer ring of the bearing and that is formed with at least one pair of grooves in which said sensors of said at least one pair of said sensing devices are respectively inserted.

6. The detecting apparatus as claimed in claim 1, the bearing unit including two of the bearings spaced apart from each other in the axial direction (X), wherein said detector unit includes two pairs of said sensing devices respectively corresponding in position to the bearings, and an annular mount sandwiched between the two bearings and having two end mount surfaces opposite to each other in the axial direction, wherein each of said end mount surfaces faces one of the end surfaces of a respective one of the bearings, and is formed with one pair of grooves in which said sensors of one of said pairs of said sensing devices are inserted, wherein said sensors of each pair of said sensing devices abut against one of the end surfaces of the outer ring of the corresponding one of the bearings.

7. The detecting apparatus as claimed in claim 1, wherein said sensor of each of said sensing devices of said at least one pair is configured to output, based on the sensing thereof, a displacement signal which is associated with the axial displacement of said one of the end surfaces of the outer ring, and each of said sensing devices of said at least one pair further includes a signal amplifier electrically connected to said sensor of said sensing device and configured to generate the detected signal based on the displacement signal received from said sensor.

8. The detecting apparatus as claimed in claim 7, wherein said sensor of each of said sensing devices of said at least one pair is a piezoelectric sensor, and said signal amplifier of each of said sensing devices of said at least one pair is a charge amplifier.

9. The detecting apparatus as claimed in claim 1, wherein said sensor of each of said sensing devices of said at least one pair is one of a piezoelectric sensor and a displacement sensor.

* * * * *